May 15, 1951        G. N. SMITH        2,553,015
CONTROL MECHANISM FOR SLIDING CAMERA SHUTTERS

Filed June 16, 1947        10 Sheets-Sheet 1

INVENTOR.
Gordon N. Smith
BY
Attorney

INVENTOR.
Gordon N. Smith
BY
Attorney

May 15, 1951 G. N. SMITH 2,553,015
CONTROL MECHANISM FOR SLIDING CAMERA SHUTTERS
Filed June 16, 1947 10 Sheets-Sheet 3

INVENTOR.
Gordon N. Smith
BY
Attorney

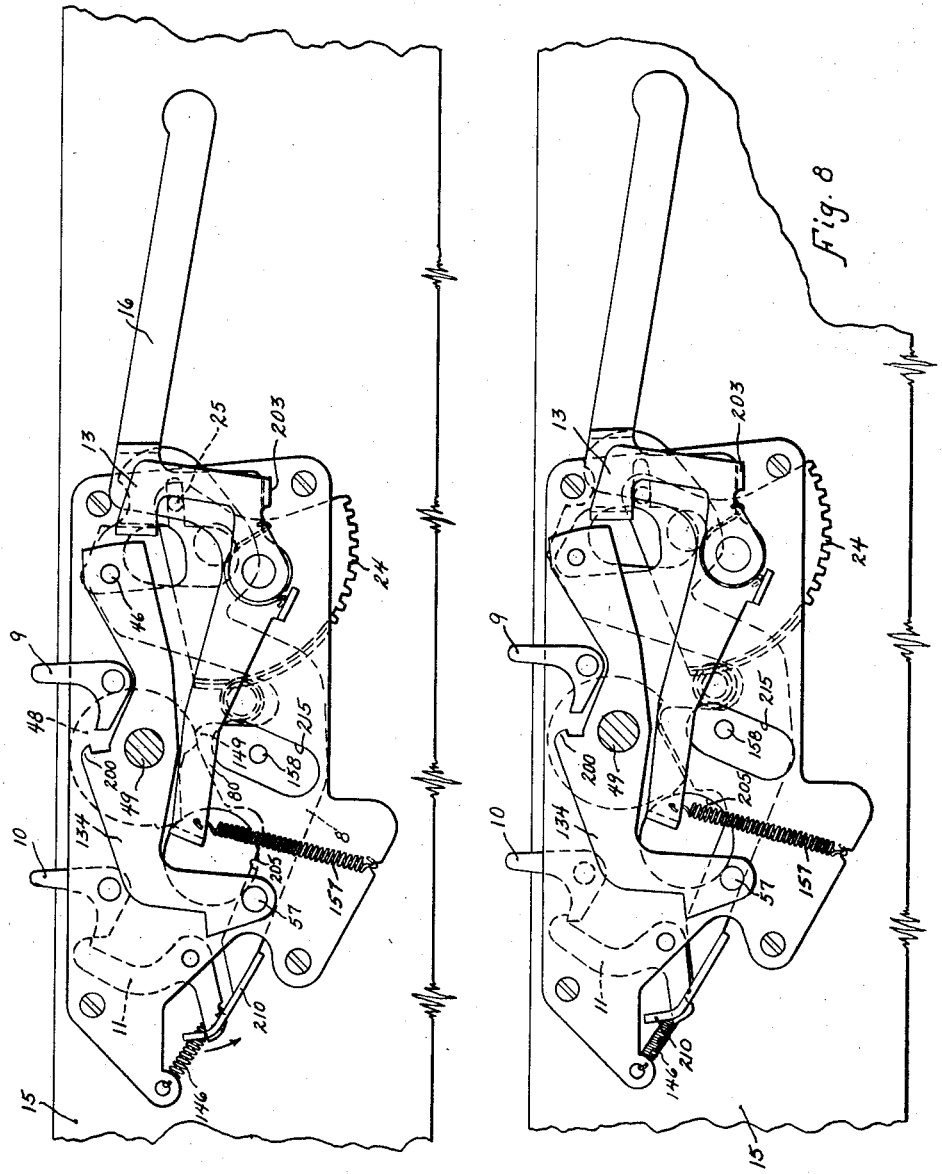

May 15, 1951 G. N. SMITH 2,553,015
CONTROL MECHANISM FOR SLIDING CAMERA SHUTTERS
Filed June 16, 1947 10 Sheets-Sheet 5
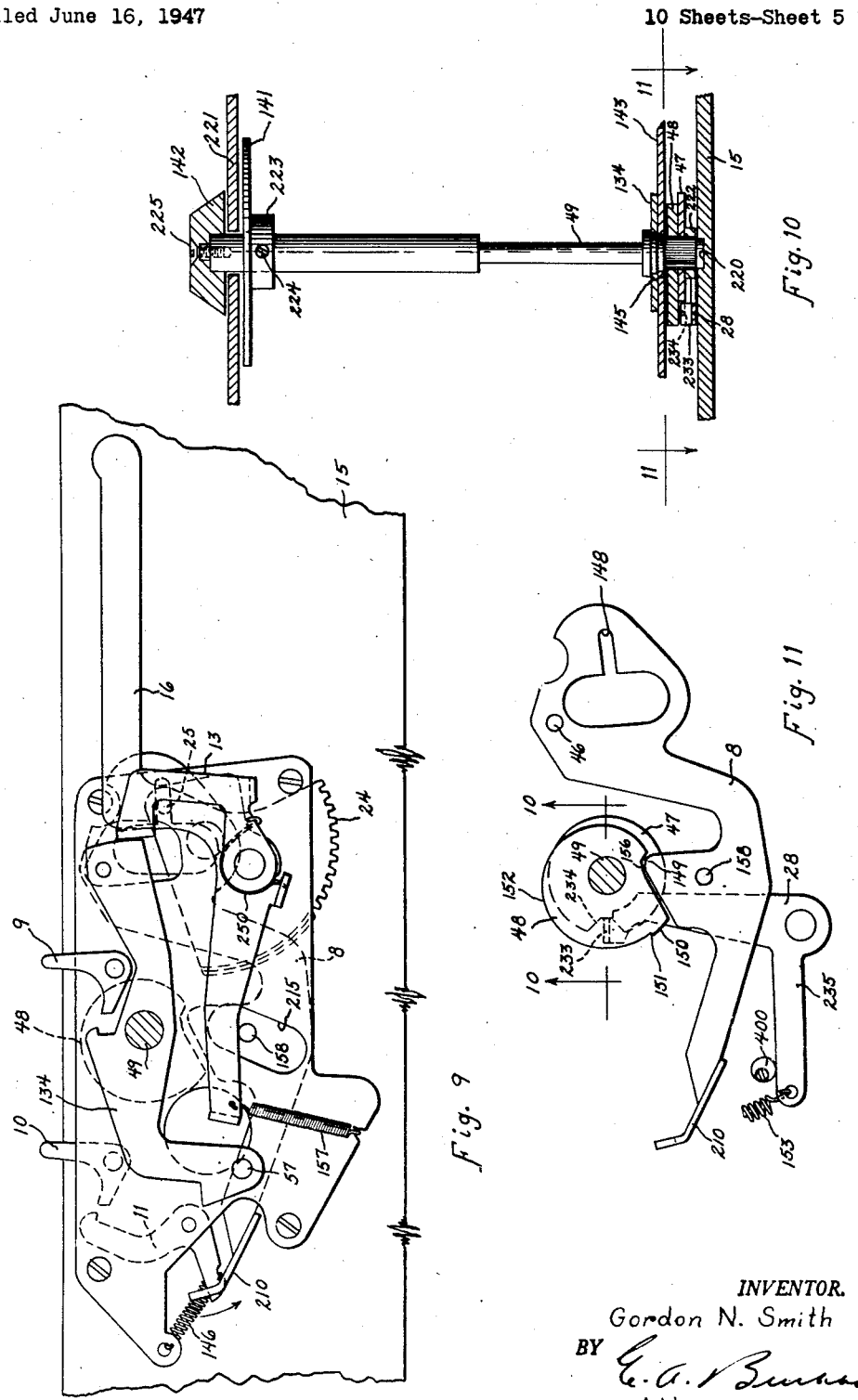
INVENTOR.
Gordon N. Smith
BY
Attorney May 15, 1951  G. N. SMITH  2,553,015
CONTROL MECHANISM FOR SLIDING CAMERA SHUTTERS
Filed June 16, 1947  10 Sheets-Sheet 6
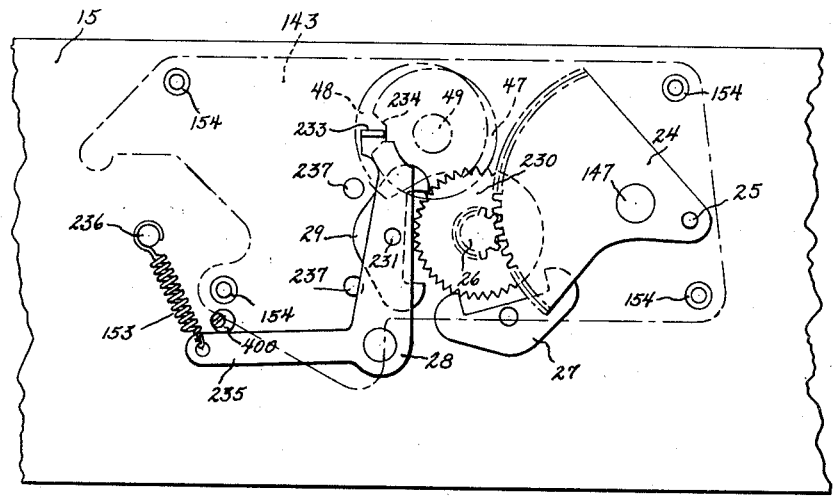
Fig. 12
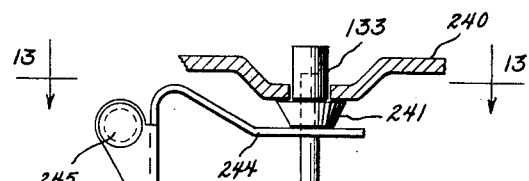
Fig. 14
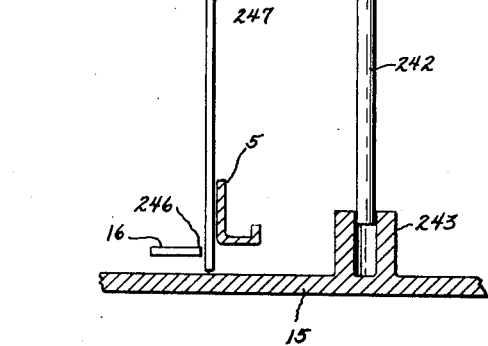
Fig. 13
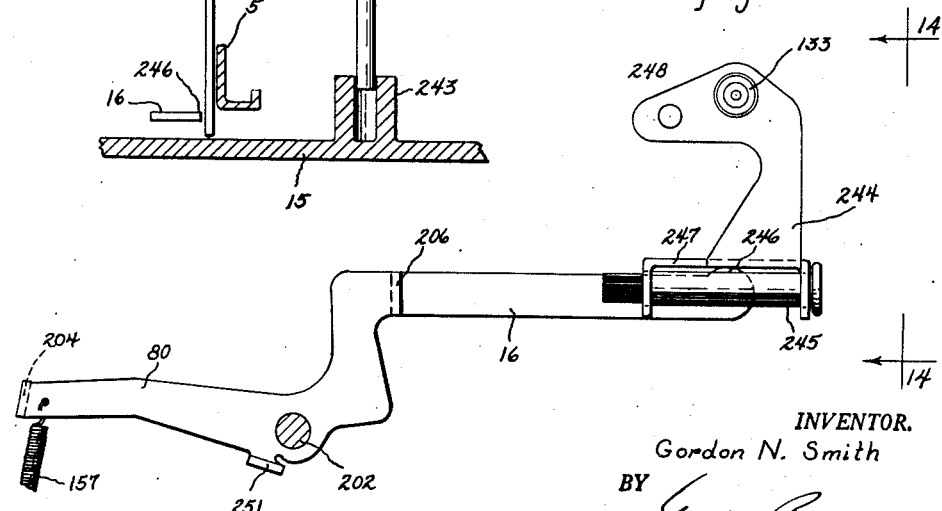
INVENTOR.
Gordon N. Smith
BY
Attorney

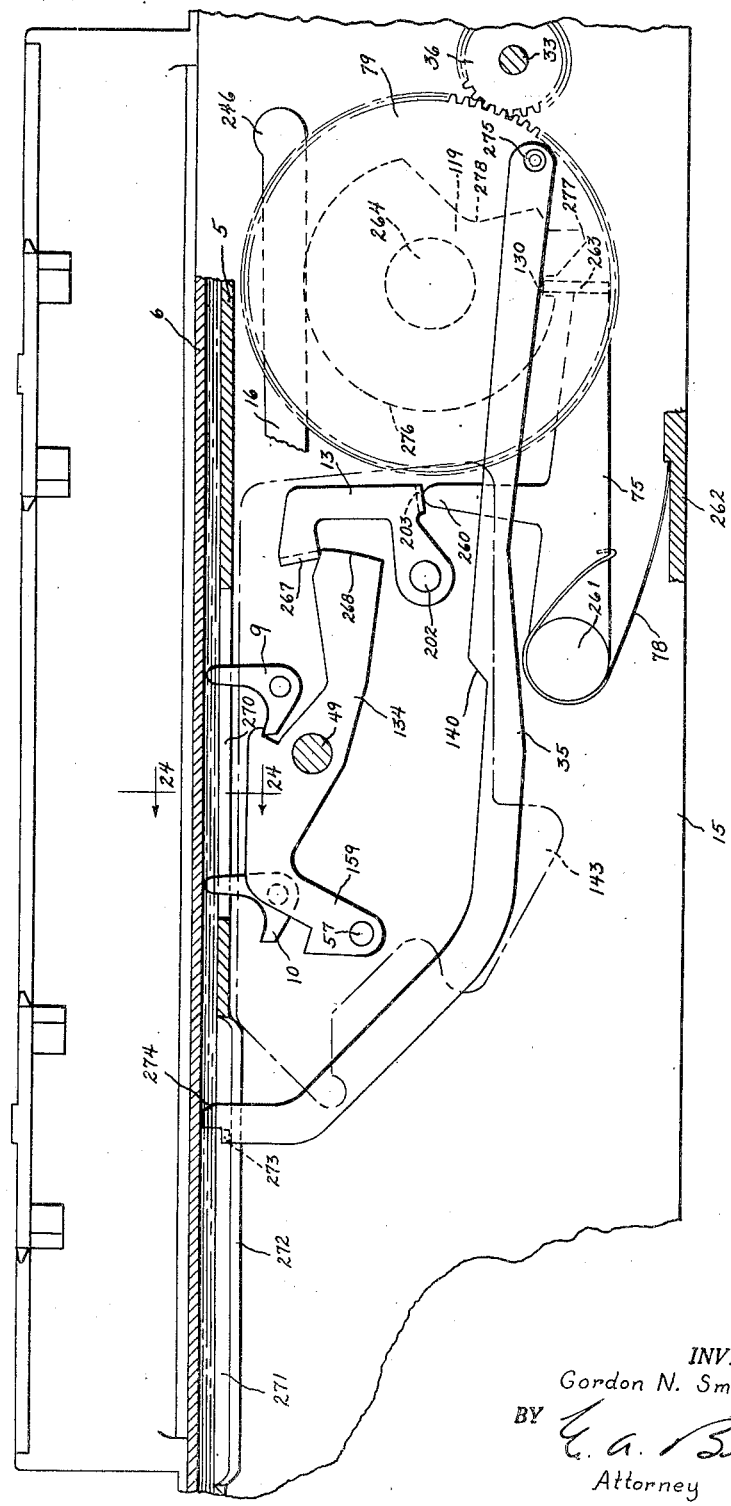

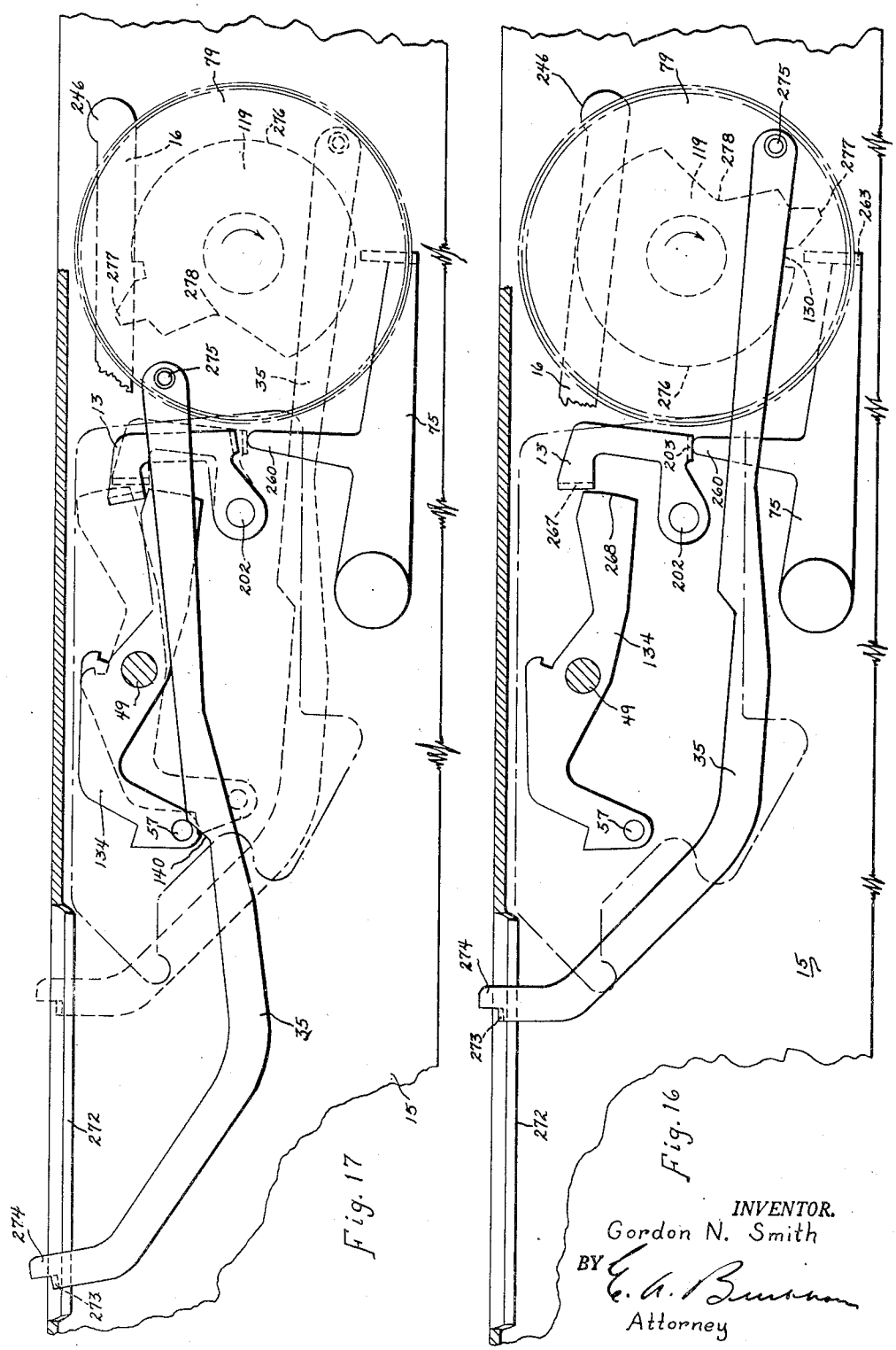

May 15, 1951   G. N. SMITH   2,553,015
CONTROL MECHANISM FOR SLIDING CAMERA SHUTTERS
Filed June 16, 1947   10 Sheets-Sheet 9

INVENTOR.
Gordon N. Smith
BY
Attorney

May 15, 1951 G. N. SMITH 2,553,015
CONTROL MECHANISM FOR SLIDING CAMERA SHUTTERS
Filed June 16, 1947 10 Sheets-Sheet 10

INVENTOR.
Gordon N. Smith
BY
Attorney

Patented May 15, 1951

2,553,015

UNITED STATES PATENT OFFICE 2,553,015

CONTROL MECHANISM FOR SLIDING CAMERA SHUTTERS

Gordon N. Smith, Portland, Oreg., assignor to Stereocraft Engineering Co., Portland, Oreg., a partnership Application June 16, 1947, Serial No. 754,961

15 Claims. (Cl. 95—55)

The present invention relates to the art of photography and has to do with various refinements and improvements in operating mechanisms forming portions of a highly adaptable camera. The present application discloses a stereoscopic camera having a pair of lenses but it will be appreciated from the following description that portions of the herein disclosed invention may be utilized in a camera having a single set of lenses for taking ordinary pictures.

One of the objects of the invention is to provide a shutter camera with a continuously adjustable exposure speed range covering a wide selection of exposure speeds, the continuous adjustment offering an infinite number of exposure speeds which are readily selectable by a single adjusting member.

A further object of the present invention is to provide a camera with a fixed high speed exposure selecting means to permit exposures at a fixed speed higher than any included in the continuously adjustable range.

Another object of the present invention is to provide a camera with a fixed low speed exposure selecting means to permit exposures at a fixed speed slower than any included in the continuously adjustable range.

Another object of the present invention is to provide means for permitting the camera to take variable manually controlled time exposures.

Another object of the present invention is to provide, in one selecting mechanism, means for causing the camera to take pictures at a fixed high speed, selectable intermediate speeds, a fixed slow speed, or manually controlled time exposures.

Another object of the present invention is to couple a shutter timer, as discussed above, to a guillotine type shutter having a pair of shutter blades for controlling the passage of light from the lens to the film, in which the blades do not lie between the lens elements. By reason of this construction the lens assembly is more easily manufactured, and the relationship of the various elements of the lens assembly is more accurately maintainable.

Another object of the present invention is to couple a shutter timer, as disclosed above, to a switch which may be placed in a photo-flash lamp circuit to insure accurate synchronization of the switch and shutter blades for photo-flash operation.

Another object of the present invention is to couple a shutter timer and synchro-switch in such a manner that the operation of the shutter release mechanism by the operator has no effect on the switch synchronization, thus eliminating the necessity for the photographer learning to maintain uniform actuation of the shutter release button.

Another object of the present invention is to construct a shutter timer and other mechanism in a compact arrangement positionable within the body of the camera in the space between the lens and the plane of the film.

Another object of the present invention is to provide a shutter timer, as disclosed above, with a calibrated exposure speed dial lying in a horizontal plane and visible at the upper surface of the camera.

Another object of the present invention is to construct shutter timing mechanisms and other camera mechanisms so as to be positionable in the space between the two light tunnels in a stereoscopic camera.

Another object of the present invention is to simplify shutter timer escapement mechanism by transforming the approximately translatory motion of a driving member to rotary motion for driving an escapement gear train.

Another object of the present invention is to simplify shutter timer mechanism by using a floating lever having movable ends and an adjustable fulcrum near its center.

Another object of the present invention is to prevent shutter bounce in a guillotine shutter by causing the shutter blades, after an exposure movement, to strike pads so designed that the shutter blades, although adjacent each other, do not strike the same pad. Stated in another manner, an object of the present invention is substantially to eliminate shutter bounce in a camera.

Another object of the present invention is to design a photo-flash switch synchronizing mechanism in such manner as to eliminate the use of pigtails for conducting the current.

A further object of the present invention is to insure that all lost motion and backlash which might contribute to erratic shutter timing be eliminated by having the escapement mechanism in motion before releasing the primary shutter blade to admit light to the film.

A further object of the present invention is to maintain a common starting position for a shutter blade timer mechanism regardless of the time interval adjustent in order to simplify synchro-switch coupling, and to insure maximum driving tension from the escapement spring.

Another object of the present invention is to position shutter blade latches for most efficient coupling to guillotine type shutter blades.

Another object of the present invention is to provide means for latching both shutter blades by a primary latch prior to the initiation of the escapement movement in order to eliminate the possibility of releasing the secondary shutter blade of a guillotine type shutter by impact due to inertia of the lever for effecting the release of the secondary latch if the camera receives a blow or is subjected to unusual movement. This object of the present invention is achieved by transferring control of the secondary blade from a primary latch to a secondary latch after initiation of the escapement movement.

Another object of the present invention is to combine a shutter camera with a photo-flash switch so as to close the switch a preselected time interval before the opening of the light apertures for film exposure, and to open the switch after the exposure to permit safe replacement of a flash bulb.

Another object of the present invention is to combine one contact blade of a synchro-switch with the escapement mechanism in such manner that the spring tension of the contact blade helps accelerate the escapement as the shutter is tripped, but will be expended before actual opening of the shutter in order to preserve the shutter timing calibration.

The foregoing and other objects and advantages of the present invention will be more readily understood from inspection of the accompanying drawings taken in connection with the following specification, wherein like numerals refer to like parts throughout.

In the drawings:

Fig. 7 illustrates the shutter release and timing mechanism just after being released to take an exposure of the longest possible adjustable duration or at the slowest fixed speed;

Fig. 8 illustrates the shutter release and timing mechanism when released to take a time exposure, the parts being illustrated as they would appear corresponding to the "bulb open" position of a standard camera;

Fig. 9 illustrates the shutter release and timing mechanism at the termination of a time exposure with the parts in the position they would assume corresponding to the "bulb closed" position of a standard camera;

Fig. 10 is a partial vertical section taken substantially from the plane indicated by the line 10—10 (center of Fig. 5) illustrating the exposure time selecting mechanism, selecting knob and exposure speed dial;

Fig. 11 is a partial horizontal section taken substantially along line 11—11 of Fig. 10;

Fig. 12 is a plan view of the escapement mechanism with the timer cams illustrated in dash line for the purpose of clarity;

Fig. 13 is a plan view looking down upon the trip mechanism, along the line 13—13 of Fig. 14, with all other parts eliminated for clarity;

Fig. 14 is an end elevation taken from the plane 14—14 of Fig. 13;

Fig. 15 is a plan view illustrating the reset mechanism with the parts illustrated in the "set" position corresponding to Fig. 5;

Fig. 16 is a view similar to Fig. 15 showing the reset mechanism after the shutters have been tripped, the parts being shown in positions corresponding to Fig. 6;

Fig. 17 is a similar view showing the reset mechanism in operation to reset the shutters and shutter release mechanism, with various parts shown in dotted line at the commencement of a resetting operation and in full line in the course of a resetting operation;

Although all portions of the mechanism herein disclosed function in conjunction with each other various portions thereof will be separately described in order more clearly to understand the operation of the camera. These portions will be set aside under appropriate subtitles.

*Shutter release and timing mechanism*

Figure 24:
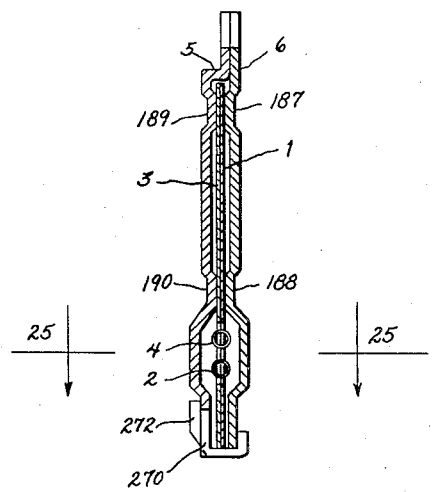
Fig. 24 is a vertical section taken through the shutter blades and the shutter blade case substantially along the line 24—24 of Fig. 15.

The shutter releasing and timing mechanism is mounted upon and between a pair of plates, the bottom plate 15 of the camera and an intermediate plate 143. The plate 143 is mounted upon a plurality of bosses 154 extending upward from the bottom plate 15, so that there is a space between the plates. A primary shutter latch 9 is mounted on the upper surface of plate 143 and a secondary shutter latch 10 is mounted on the lower surface of plate 143. The latches extend beyond the plate a sufficient distance to engage in slots 166 and 167 (Fig. 20) of the front and rear shutter blades. The shutter consists of a pair of shutter blades 1 and 3 movable from left to right by shutter blade springs 2 and 4 respectively (Fig. 24). When the shutter blades are "set" at the left of their travel the latch 9 holds them in this position, at which position apertures 136 in the rear blade 3 are aligned with the lenses 98 and 99, but light is prevented from reaching the film by the blade 1 whose apertures 135 are to the left of the lenses and not in line with them. The latch 10 is normally locked by the latch pawl 11 which is also pivoted beneath plate 143. The shutter blade 1 never bears against latch 10, and blade 3 normally does not bear against latch 10, which is a secondary latch or a timing latch. Latch 10 is released from latch pawl 11 through the operation of a main lever 8 (Figs. 5 to 9) which may be unintentionally moved due to impact or inertia effect, thus causing the secondary latch pawl 11 to move out of engagement with the secondary latch 10, but as soon as such a transient phenomenon has ceased the latch 10 is again retained by the latch pawl 11. A light spring 139 holds latch 10 in a counterclockwise direction to be engageable by pawl 11. Latch 9 normally holds both shutter blades 1 and 3. Latch 9 is also lightly urged counterclockwise by a spring 138. When latch 9 is released, as will presently appear, the stronger spring 2 operating upon the blade 1 causes latch 9 to be moved in a clockwise direction to release blade 1, which thereupon moves so as to bring its apertures 135 in line with the lenses, and since the apertures 136 in blade 3 are in line with the lenses light is permitted to reach the film. Latch 10 has now engaged blade 3 due to its having been released by latch 9 and moving slightly to the right. Latch 10 will be released at a later period, as will appear, so as to cause the apertures 136 to move to the right beyond the lenses, thus cutting off the light from the film. It may be seen that the timing of releasing latches 9 and 10 times the exposure of the film.

The latch 9 is retained in latching position by a hook 200 on a primary latch pawl 134 is pivoted for convenience on a timing cam shaft 49. The primary latch pawl 134 extends toward the right end of plate 143 and carries a lever drive pin 46 at its right end which extends downward through an irregularly shaped opening 201 in the plate 143. The primary latch pawl 134 also extends toward the left end of plate 143 and is provided with an offset extension which carries a primary latch pawl reset stud 57. When the primary latch pawl 134 moves counterclockwise about its pivot 49, the hook 200 moves out of engagement with the latch 9 to permit the shutter blade 1 to snap toward the right.

Figure 5:
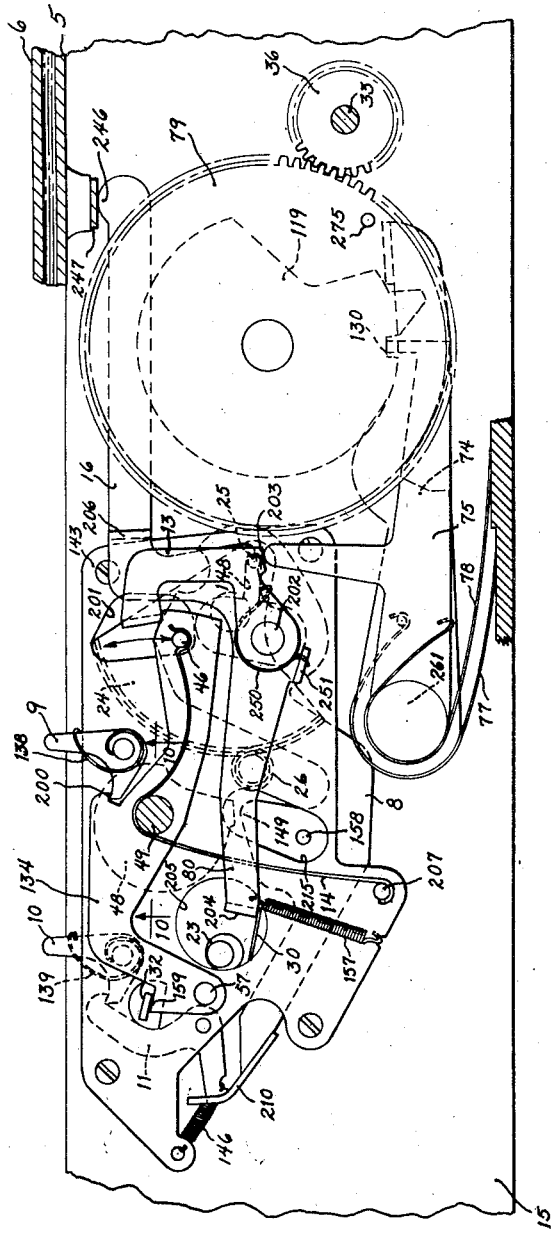
Fig. 5 is a partially schematic view of the major portions of the shutter release and timing mechanism in "set" position. It is to be appreciated that various portions of this mechanism overlap but occupy various levels, hence some portions are drawn in skeleton outline.

The latch pawl 134 is retained in the position illustrated in Fig. 5, which is in "set" position, meaning that the camera is set to take a picture. In this position its right end is engaged by the downwardly turned end of a release lever pawl 13 pivoted on a release lever pivot 202 mounted on plate 143. The release lever pawl is provided with a downwardly turned tab 203 which engages a shoulder on a release lever 16 extending toward the right of the plate 143 and pivoted at 202.

The left end of lever 16 extends over plate 143 and has a tab 204 passing through a hole 205 in the plate 143. A release lever spring 157 tends to hold the release lever in the position illustrated in Fig. 5. When the lever 16 is shifted clockwise to the position shown in Fig. 6 the shoulder thereon engaging the tab 203 rocks the release lever pawl 13 from engagement with the end of primary latch pawl 134. A strong spring 14 having one end embracing a stud 207 on plate 143 is tensioned about timing cam shaft 49 and hooked around the lever drive pin 46 on the primary latch pawl 134. When the release lever 16 is thus moved out of the way the spring 14 moves the primary latch pawl 134 in a counterclockwise direction. After it moves far enough the hook 200 is disengaged from the latch 9 and the shutter blade 1 snaps to the right. It is to be appreciated that, since the shutter blades are not shown in Figs. 6 to 9 inclusive, the latches 9 or 10, as the case may be, are not correctly illustrated in some cases since they should be rocked clockwise by the shutter blades. The reason for illustrating the latches as shown is to emphasize the timing action of the release mechanism.

In order to release the secondary latch 10 means are provided to rock the secondary latch pawl 11 counterclockwise about its pivot against the tension of a spring 146. Such means comprises a hook provided on the lower surface of the left end extension 210 of main lever 8 which normally bears lightly against the end of release pawl 11 or may float adjacent thereto. The left end 210 is twisted to lie in a vertical plane, so that after releasing pawl 11 it bears against the edge of plate 143. The lever 8 is a floating lever not having any fixed pivot. It is mounted beneath the plate 143 and is pivoted to the primary release pawl 134 by means of the lever drive pin 46 extending through the plate clearance hole 201.

Motion of pawl 134 and main lever 8 is transmitted to the escapement by a main lever slot 148 engaging a sector gear stud 25 mounted upon and projecting upwardly from a sector gear 24 carried by a sector gear pivot 147 journalled in the two plates 15 and 143.

The other mechanism for controlling the manner of movement of the main lever 8 comprises a timing cam 48 splined to the timing cam shaft 49. The timing cam has a major radius portion 150 (Fig. 11) extending for a few degrees. This is followed by a slight step 151 which marks the commencement of a spiral surface 152, extending for substantially three-fourths of the periphery of the cam. This is followed by a further step leading to a minor radius 156 extending for a few degrees, the points of minor and major radius being joined by a straight surface. The relative position of cam 48 may be fixed by rotating the shaft 49, the desired location thereof being indicated by a dial as will presently appear.

The sector stud 25 engaged in slot 148 acts to translate the relatively linear motion of slot 148 to rotary motion of the sector gear 24. In so doing the movement of the right end of main lever 8 is retarded due to the drag of an escapement mechanism driven by the sector gear 24. The stud 25 and slot 148 may be called a flexible coupling. The direction of movement of any portion of main lever 8 is determined by the movement of pin 46 and the adjustment of cam 48, but the time interval between release of latches 9 and 10 is determined by the speed of movement of sector gear 24 and the setting of cam 48.

Figure 6:
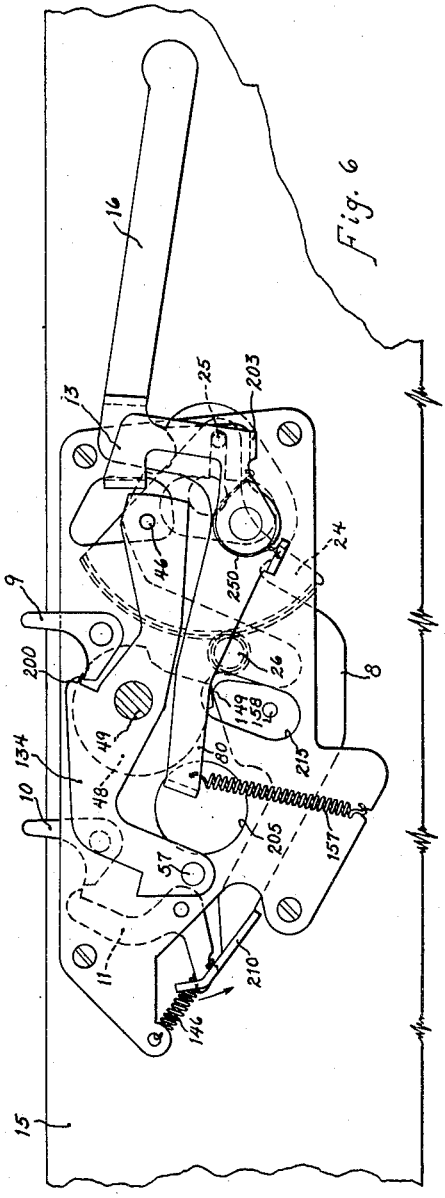
Fig. 6 is a view illustrating the major portion of the shutter release and timing mechanism just after being released for taking a high speed exposure.
Figure 21:
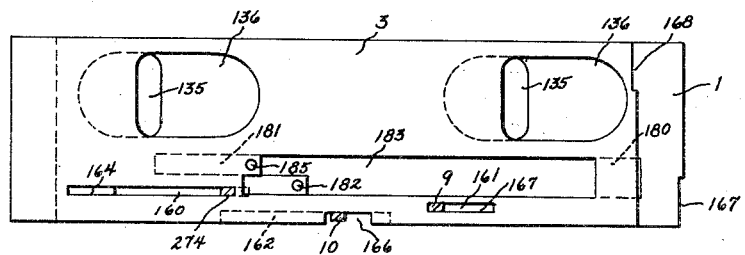
Fig. 21 shows the shutter blades in the positions they occupy when the camera is "set," with the resetting mechanism in position corresponding to that illustrated in dash line in Fig. 17.
Figure 22:
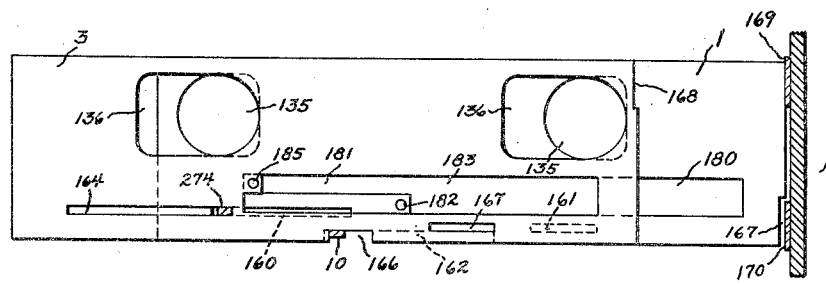
Fig. 22 illustrates the shutter blades in the positions corresponding to the commencement of a time exposure.
Figure 23:
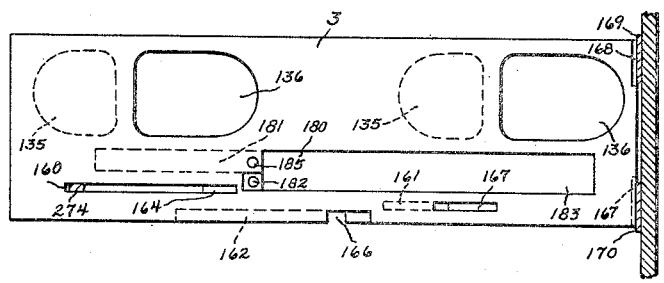
Fig. 23 illustrates the shutter blades in the positions they occupy at the end of an exposure and prior to the operation of the reset mechanism.

When the major radius portion 150 of cam 48 is positioned at a desired point, such as illustrated in Fig. 6, it is in position to engage a main lever fulcrum 149 provided on the main lever 8. In this position release of the primary latch pawl 134 and slight counterclockwise movement of the primary latch pawl causes release of the secondary latch 10 prior to release of the primary latch 9. This is brought about as follows:

The spring 14 urges the pin 46 counterclockwise. Due to the retarding action of the stud 25 in slot 148 the left end of lever 8 is rocked up until main lever fulcrum 149 contacts the cam portion 150. Slight counterclockwise rotation of pawl 134 rocks the main lever 8 about its fulcrum 149 to cause the extension 210 to strike pawl 11 and release latch 10 due to the force of spring 14 being greater than that of spring 145. Thus, with this adjustment of cam 48, the latch 10 never holds either shutter blade. The timing of the mechanism is such that release pawl 11 clears the latch 10 slightly before the hook 200 clears the latch 9. As soon as the hook 200 clears latch 9 the springs 2 and 4 cause movement of the shutter blades 1 and 3 since neither latch restrains them. The springs 2 and 4 are of substantially equal strength and operate against substantially equal load so that the shutter blades 1 and 3 move at substantially equal speeds across the lenses. The exposure will, therefore, be very fast inasmuch as the apertures 135 and 136 flash past the lenses, the extent of exposure being controlled entirely by the overlapping of the apertures as they move past the lenses. (Fig. 21.)

When the cam 48 is rotated to a slight extent counterclockwise from the position shown in Fig. 6 the beginning of the spiral 152 is presented for engagement with the fulcrum 149. In such case the movement of main lever 8 to contact the release pawl 11 and release the secondary latch 10 occurs after the hook 200 has released the primary latch 9. This is due to the delayed engagement of the fulcrum 149 and the cam face 152 which permits the lever 8 to rock about fulcrum 149 and contact secondary latch pawl 11 only after hook 200 has released primary latch 9. The motion of main lever 8 is retarded by the sector gear stud 25 engaging the main lever slot 148, said pin rotating the sector gear 24 and its pivot 147 and driving a ratchet 230 through a ratchet pinion 26 (as will be explained later). The ratchet mechanism provides means for slowing the movement of the sector gear so that an interval of time is provided between the release of latch 9 and the release of latch 10. The radius of cam 48 at this position is such as to permit the hook 200 to release latch 9 before the lever extension 210 strikes release pawl 11 to release latch 10. Thus the latch 9 releases both blades, blade 1 continuing to its end position where its apertures uncover the lenses, blade 3 moving first into contact with latch 10, then after a time interval moving to its end position. The exposure time interval may be increased to a maximum continuously adjustable position almost to the limit of the spiral 152.

When the cam 48 has been rotated to the position illustrated in Fig. 7, a notch 234 in a long interval cam 47 splined to shaft 49 is brought into alignment with a cam follower end 233 on a long interval lever 28 (Figs. 10, 11, 12). As will be explained later, this action brings a long interval pawl 29 into engagement with the ratchet 230 in addition to an escapement pawl 27 which normally engages the ratchet 230. Thus gear 24 must overcome the slowing effect of the two pawls 27 and 29 as the lever 8 is driven by spring 14 through pin 48 from its "set" position to a position where its fulcrum 149 bears against the cam 48 to cause the extension 210 to release the secondary latch 10. When the cam 48 is in this position at the smallest end of the spiral 152 a long interval of fixed duration elapses between the release of shutter blade 1 and the release of shutter blade 3.

When the cam 48 is rotated to the position shown in Fig. 8 the minor radius 156 is presented to the fulcrum 149, this minor radius being such that the lever 8 never comes to bear against cam 48 and movement of the sector gear 24 is arrested by the gear 24 striking a boss 154 before any tension can be brought to bear by extension 210 against pawl 11 to release the secondary latch 10. This condition will remain static as long as the release lever 16 is held in its depresed position. This position corresponds to the "bulb" poition of a camera and continues as long as the lever 16 is held depressed. Upon release of the lever 16 spring 157 causes the lever 16 to move counterclockwise. The lever 8 is floating in a position such that a main lever stud 158 thereon is near the upper end of a slot 215 in the plate 143 and is in position to be struck by the tail 80 of lever 16 (Fig. 9). The movement of the lever 8 through this medium is sufficient to cause the extension 210 to release the secondary latch 10 and cause the blade 3 to end the time exposure, this action corresponding to the closing of a camera shutter by a bulb time exposure mechanism.

I thus have, through the same sets of parts, means for instantaneous exposure, means for infinitely variable fast exposure, means for a set, long exposure, and means for a manually controllable time exposure of lengthy extent.

*Exposure speed adjustment*

Figure 1:
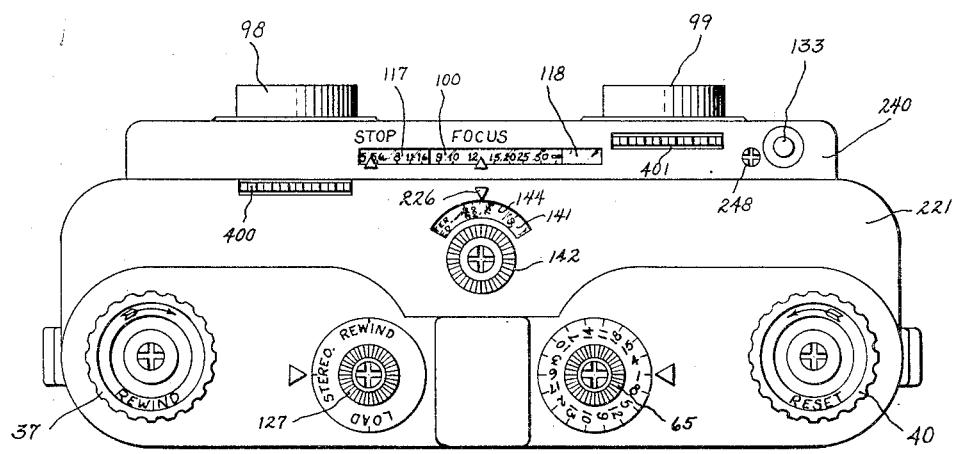
Fig. 1 is a plan view looking down upon the top of a stereoscopic camera having the present invention incorporated therein.
Figure 2:
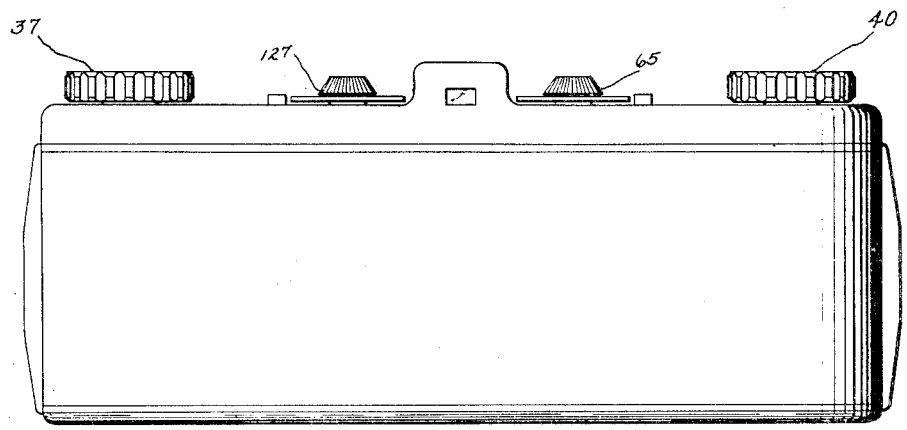
Fig. 2 is a view in elevation of the rear surface of the camera.
Figure 3:
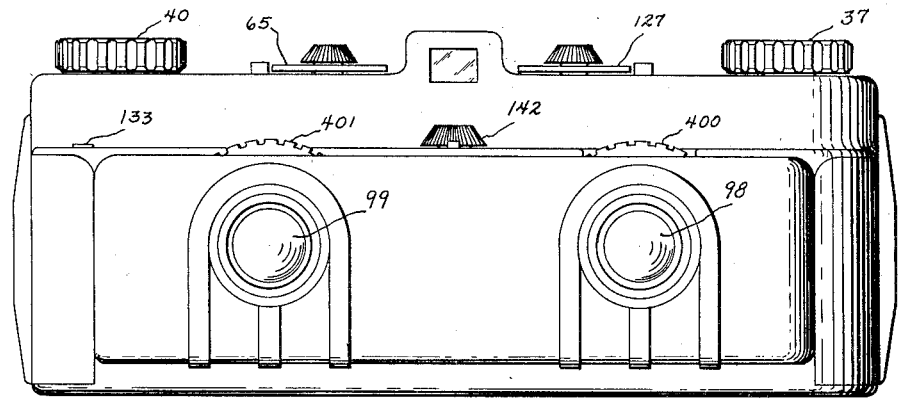
Fig. 3 is a view in elevation of the front of the camera.
Figure 4:
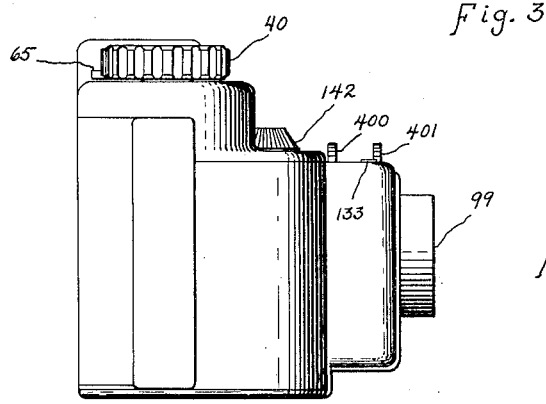
Fig. 4 is a view in elevation of the right end of the camera.

Figs. 10 and 11 show the arrangement of the cams 47 and 48, the shaft 49 and a knob 142 together with an exposure speed dial 141, the latter two items being visible in Fig. 1, from which a more comprehensive idea of the location of the adjusting knob may be obtained. It will be seen from Fig. 10 that the extreme lower end of shaft 49 rests in a cavity 220 in the bottom plate 15 and its upper end passes through a suitable opening in the top plate 221 of the camera. The lower end of the shaft is splined to receive cams 47 and 48 and hold them against relative rotation with respect to each other and the shaft 49. A collar 222 is mounted on the shaft to hold the cams against endwise movement against the thrust of a friction washer 145 which tends to hold the assembly in its adjusted position. Immediately above the washer 145 the shaft is provided with a step enlargement which is journaled in an opening in the mounting plate 143. Immediately thereabove the shaft is provided with a second step that journals the primary latch pawl 134, which is retained in position by a third step in the shaft. The upper end of the shaft carries a hub 223 which is fastened to the shaft by a set screw 224, and the dial 141 is fixed to the upper surface of the hub 223. The periphery of the dial carries figures and indicia on its upper surface which are visible through the arcuate window 144. The upper end of the shaft, after passing through the top plate 221, is keyed to enter a key socket in the knob 142 which is retained in position by a screw 225 threaded into the end of the shaft. Rotation of the knob 142, therefore, rotates the cams 47 and 48, and the extent of rotation thereof is indicated by the dial indicia passing an index point 226 on the upper surface of the plate 221. The indicia carried on the dial 141 indicate the fraction of a second of exposure, or other information relating to the exposure speed.

Escapement mechanism

Fig. 12 further relates to the mechanism disclosed in Figs. 5 to 11 inclusive in that it discloses the complete escapement mechanism including the sector gear 24. In this figure, for clarity of illustration, the mounting plate 143 and the cams 47 and 48 are shown in dash outline. It will be seen that the sector gear 24 engages with the ratchet pinion 26 which is fastened to the upper surface and concentric with the escapement ratchet 230. When the portion of cam 48 including the major radius 150 and all but the minor radius is in position to engage the fulcrum 149 of the main lever 8 only one of two ratchet escapement pawls is engaging the teeth of the ratchet 230 to slow the movement of the sector gear 24. This primary escapement pawl is indicated by the numeral 27. It may be seen that the teeth thereof engage the teeth of the ratchet 230 and permit their release in timed steps rather than in a continuous uninterrupted movement. This type of escapement is well known in the art.

When the cams 48 and 47 are turned to permit the fulcrum point 149 of lever 8 to engage the cam 48 at a radius but slightly larger than the smallest radius portion of the spiral 152 the exposure is at a maximum time exposure of fixed duration with the shutter closing automatically at the end of the time. This is accomplished by mechanism disclosed in Fig. 12 in the position disclosed in Fig. 12. It will be seen that the long interval escapement pawl 29 is pivoted at 231 beneath one arm of the long interval lever 28 which is pivoted on a boss in plate 15 and secured with a screw 232 threaded into the mounting boss. The far end of the long arm of lever 28 is provided with cam follower end 233 which is adapted to engage the long interval notch 234 in cam 47. Thus the long interval escapement pawl 29 is brought into engagement with the teeth of the ratchet gear 230 by a tension spring 153 extending between the crank arm 235 of lever 28 and a boss 236 extending upward from the bottom plate 15. The arm 235 is urged against an eccentric screw 400, which may be rotated to adjust the engagement of pawl 29 with ratchet 230. The ratchet gear 230 now has to overcome the inertia of the pair of pawls 27 and 29 rather than the single pawl 27 during the movement of the sector gear 24.

When the shaft 49 is rotated in either direction from this position the long interval escapement pawl 29 is removed from engagement with the teeth of the ratchet gear 230 and the ratchet gear has to overcome the inertia of the pawl 27 only, therefore the length of time required for the main lever 8 to pivot about the cam 48 is controlled entirely by the single escapement pawl 27. In this position the back of pawl 29 engages a pair of bosses 237 preventing the pawl from rocking into engagement with the ratchet 230.

Trip mechanism

Referring to Figs. 5, 13 and 14 there is disclosed means whereby the release lever 16 is moved from the position illustrated in Fig. 5, the "set" position, to the position illustrated in Fig. 6, the "release" position. This mechanism comprises a shutter release button 133 which is located in and projects above an opening in an extension of the top plate 221 indicated by the numeral 240. The button 133 is provided with a flange 241 limiting outward movement of the button. A button guide pin 242 extends downward into an opening in a boss 243 rising upward from the bottom plate 15. The pin 242 passes through an opening in the short arm of a trip lever 244 which is mounted upon a pivot 245 pressed into the frame of the camera. The button 133 rests upon the horizontal short arm of lever 244, which is normally restrained in its uppermost position by the spring 157 engaging the tail 80 of lever 16 (Fig. 5). The long right end of lever 16 is provided with a rounded knoblike projection 246 which engages the lower extremity of the vertical long arm 247 of the trip lever. A screw 248 is threaded into the portion 240 of the top plate and is removable to permit the attachment of a standard release cable. Counterclockwise rotation of trip lever 244 is limited by the interference of shutter case plate 5 with arm 247. It may be seen from the foregoing and the description of the mechanism in Figs. 5 to 12 inclusive that when an accurately fast exposure is desired the button 133 is depressed, which action will cause release of both the shutter blades. When a manually controlled time exposure is desired the button 133 is depressed, but due to the inability of main lever 8 to release the secondary latch 10, the film will remain exposed to the light until button 133 is released, whereupon spring 157 will cause lever 16 to return to its set position and in so doing cause the tail 80 to engage the main lever stud 158 to release the secondary latch and end the time exposure.

Reset mechanism

Figs. 15, 16 and 17 illustrate the resetting mechanism for the camera. Fig. 15 should be studied in conjunction with Fig. 5, which, it will be recalled, illustrates the mechanism in the "set" position with the rear shutter blade having its apertures in front of the lenses and the front shutter blade held with its apertures to the left of the lenses by the latches 9 and 10. In this position the release lever pawl 13 is holding the primary latch pawl 134. The tab 203 is resting against the elbow of the release lever 16. The opposite face of the tab 203 engages the tip of an arm 260 on a reset stop pawl 75 which is pivoted at 261 to the camera frame. A spring 78 is tensioned around the pivot 261 and has one end engaged against the rear plate 262 of the camera and its opposite end hooked over the rear edge of the reset stop pawl 75. The spring 78, therefore, urges a reset stop pawl tab 263 into engagement with a reset cam notch 130 provided in the surface of a cam 119 which is mounted upon a pivot 264 extending upward from the bottom plate 15. When the release lever 16 is rocked to the position illustrated in Figs. 6 and 16 the release lever pawl 13 is rocked clockwise and the tab 203 rocks the reset stop pawl clockwise to disengage it from the cam notch 130 against the tension of the spring 78. The release lever pawl 13 is provided with a downwardly extending tab 267 which engages an arcuate face 268 on the right end of primary latch pawl 134 which is moving counterclockwise. Therefore, as long as the primary latch pawl is released the reset stop pawl 75 cannot re-engage the reset cam notch 130.

The reset cam 119 is fixed to a large reset gear 79 which meshes with a small reset gear 36 mounted upon a shaft 33 extending from the bottom plate 15 through the top cover and which has fixed thereto a reset knob 40 (Fig. 1). The reset knob may now be turned counterclockwise and the resetting of the shutter mechanism will be accomplished in one complete revolution of the reset gear 79.

In Fig. 15 it will be seen that the latches 9 and 10 project through a slot 270 in a rear shutter case plate 5 and project toward a parallel front shutter case plate 6. The latches 9 and 10 engage the shutter blades 1 and 3 which lie between the plates 5 and 6. When the latches 9 and 10 are released they may pivot clockwise to permit the shutter blades to move from set position at the left end of the slot between the plates 5 and 6 to their released position toward the right end of the slot.

The rear shutter case plate 5 is provided with a slot 271, the lower edge of which is pressed rearwardly to form a guide rail 272 extending rearwardly from the surface of the plate 5. The guide rail 272 is engaged by a downwardly turned tab 273 on the end of a reset lever 35, the tip of which, adjacent tab 273, is provided with a reset crank finger 274 projecting into the space between plates 5 and 6 and engaged in slots 163 and 164 in the shutter blades. The reset lever 35 overlies the shutter release mechanism and extends toward the right end of the camera where it is pivoted upon a pin 275 projecting upward from the face of gear 79. When the camera is "set" lever 35 occupies the position illustrated in Fig. 15.

The slots 163 and 164 in the shutter blades, as will presently appear, are of such length that upon termination of the exposure the left ends of the slots in the shutter blades are closely adjacent the finger 274 on the reset crank. As soon as the exposure is completed, the release lever 16 is returned to its initial position, as indicated in Fig. 15, permitting the tab 267 of release lever pawl 13 to bear against the face 268 of pawl 134 by action of a spring 259 hooked over a tab 251 on lever 16, tensioned around the hub of pawl 13, and hooked over the edge of pawl 13. This readies the release lever pawl 13 to latch the primary latch pawl 134, but due to the engagement of the tab 267 with the face 268 (Fig. 16) it may not do so, and the reset stop pawl 75 is held in inoperative position.

In Fig. 17 the primary latch pawl 134 is shown in dash lines at the end of its movement corresponding to the illustration in Fig. 8, with the release lever pawl 13 still held in clockwise position. It is also seen in this figure that the release lever 16 has returned to its initial position and at the termination of the exposure the reset lever 35 (in dash lines) still occupies the reset position with its finger 274 at the right end of the guide rail 272. In this position the primary latch pawl reset stud 57 lies closely adjacent an edge of a portion of the reset lever 35. The operator now turns the reset knob 49 counterclockwise, thus rotating the reset gear 79 clockwise. The reset lever 35 is thus caused to bear against the stud 57 to rock the pawl 134 clockwise. As will be recalled, this causes repositioning of the sector gear 24 and the main lever 8 to their "set" position due to the interconnection of these parts. During all of this time the reset stop pawl 75 is held from engagement with the reset cam 119, except for a brief interval when it is moved still farther clockwise as the tab 263 rides over the cam lobe 277. A reset crank offset 140 engages the primary latch pawl reset stud 57 (Fig. 17) as the gear 79 completes substantially one-half of a revolution, whereupon additional rotation of gear 79 causes reset lever 35 to move the primary latch pawl reset stud to the position it occupies when the primary release pawl 134 is in its "set" position. The reset lever 35 now begins to move away from engagement with the stud 57 but the pawl 134 is retained in "set" position by the release lever pawl 13 which has been moved counterclockwise by spring 259. Spring 78 now brings reset stop pawl 75 to bear against the face 276 of cam 119 which is of greater radius than the bottom of the notch 139. The remaining semi-revolution of gear 79 merely returns the reset lever 35 to its position toward the right of the camera until the tab 263 drops into the notch 139. The lobe 277 is provided on the cam 119 immediately beyond the notch 139 which has a sloping face engageable with a regulating lever 74 associated with the film advance mechanism. Lobe 277 and a relief 278 on the cam face 276 are incidental to the shutter reset operation.

Shutter blades

Figure 18:
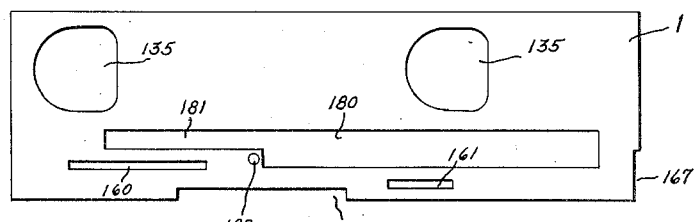
Fig. 18 is a rear view of the front shutter blade.
Figure 19:
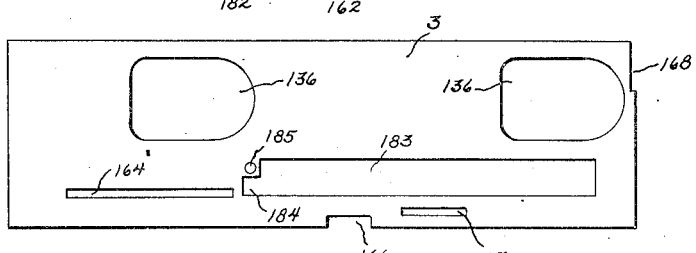
Fig. 19 is a rear view of the rear shutter blade.

Figs. 18 to 25 inclusive illustrate the shutter blades and their operation. In Fig. 18 there is disclosed the front shutter blade 1 which is provided with a pair of apertures 135 having their left ends rounded and of such diameter as to permit the passage of light through the lenses without interference. The shutter is provided with a long slot 160 toward the left end, a short slot 161 near the center, and an edge slot 162 extending from the right of the center line toward the left end. An end notch 167 is provided in the lower right corner. The rear shutter blade 3, as disclosed in Fig. 19, is provided with a pair of apertures 136 having their right ends rounded and of the same radius as the rounded ends of apertures 135. The apertures 136 are substantially rectangular beyond the rounded ends and are longer than apertures 135. A slot 164 is adapted to overlie the slot 160. A slot 167 is in horizontal alignment with the slot 161 and an edge slot 166 is in horizontal alignment with the slot 162. The upper right corner is provided with an end notch 168.

Figure 20:
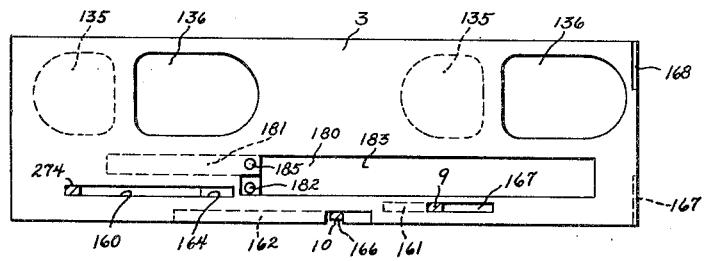
Fig. 20 is a similar view showing the shutter blades superimposed and in the positions they occupy at the end of a resetting movement with the resetting mechanism corresponding to the position shown in full line in Fig. 17.

In Fig. 20 the blades 1 and 3 are shown in their relative position when pushed by the reset lever 35 to the left end of the channel they occupy between the blade case plates 5 and 6. It will be seen that the finger 274 on the reset lever has engaged the left ends of slots 160 and 164 to push the blades completely to the left, which position corresponds to Fig. 17 illustrating the action of the lever (refer to solid lines of lever 35).

Tips of the latches 9 and 10 bear against the plates as the plates slide past them from right to left until the appropriate slots receive them. The light spring 138 urges the latch 9 into the slots 161 and 167, and the light spring 139 urges the latch 10 into the slots 162 and 166. This readies latch 9 for engagement by primary latch pawl 134 and readies latch 10 for engagement by secondary latch pawl 11. It will be recalled that the offset 140 on reset lever 35 will now reposition the pawl 134 and associated mechanism so that hook 209 will engage the tail of latch 9. Repositioning of primary latch pawl 134 will rock the main lever 8 clockwise to move its portion 210 away from the tail of latch pawl 11 permitting spring 146 to return the pawl 11 into engagement with latch 10.

As soon as the pin 275 passes beyond dead center and substantially coincidental with the latching just described the reset lever 35 starts to retract. It will be observed in Fig. 20 that latch 9 is positioned in the left end of slot 167 which effectively prevents movement of the rear blade 3 as urged to the right by its spring 4. Latch 9 is at the right end of slot 161 so that the front blade 1 may move toward the right as urged by its spring 2 until it engages latch 9 (Fig. 21). The blades are therefore both held tensioned in the "set" position while the finger 274 retracts to the far right end of the slots 160 and 164 as the reset cam gear 79 completes its revolution to the position illustrated in Fig. 15. The blades are now in the "set" position with the camera lenses uncovered by the apertures 135 but covered by blade 1 whose apertures 135 are still to the left of the lenses. The blades are held in this position by latch 9 and it will be noted (Fig. 21) that latch 10 is slightly spaced from the left edge of slot 166 and is greatly spaced from the left edge of slot 162. Latch 10 is preferably spaced about $\frac{1}{32}$ of an inch from the left edge of slot 166 so that when the camera is "set" all of the blade restraining force is provided by latch 10 which is held by positively retained mechanism including the lever 134 and the pawl 13. Thus, if shaking, or jarring, or dropping of the camera occurs to such an extent as to cause the main lever 8, or other connected mechanism to move sufficiently to release the secondary shutter latch pawl 11, the secondary latch 10 nevertheless remains in operating position and will be re-engaged by the pawl 11 immediately after the transient disturbance.

If an instantaneous high speed exposure is desired and the fulcrum point 149 engages the major radius of the cam 48 to disengage the secondary latch 10 prior to disengagement of the primary latch 9, as soon as latch 9 is released there will be nothing to restrain the blades against movement to the right due to the effect of their springs (to be disclosed later). The two blades, therefore, flash past the lenses and expose the film at the highest speed possible, the duration of exposure being controlled by the length of the slots provided by the overlapping ends of the apertures 135 and 136 and the fixed tension of the springs 2 and 4.

If, on the other hand, an exposure of fixed duration of adjustable extent is required and the cam 48 has been positioned to present its spiral surface 152 to the fulcrum 149, the secondary latch 10 will be retained until a variable length of time has elapsed after latch 9 has been released. This action, illustrated in connection with Fig. 7, is further illustrated in connection with Fig. 22. It will be noted that latch 9 has been released first, thereby permitting the front blade 1 to spring entirely toward the right end of the camera until it is restrained from further movement at which point the rounded ends of the apertures 135 correspond with the rounded ends of the apertures 136 to provide a circular opening permitting the passage of light to the film. With the release of latch 9 by pawl 134, the movement of blade 1 pivots latch 9 clockwise against the tension of its spring 138, and the tip of latch 9 lightly presses against blade 1. Latch 10, however, is still held by the latch pawl 11 and engages and prevents the rear blade 3 from moving more than the distance necessary for the left edge of slot 166 to engage latch 10, as previously noted about $\frac{1}{32}$ of an inch. However, this slight movement does not affect the light transmitted as the extended apertures 136 require much more movement to enter the light path. Nor does this slight movement affect the timing as the movement is concluded before blade 1 uncovers the lenses. The primary function achieved by holding the blade 3 with latch 9 and not by latch 10, except when an exposure has been initiated, is to provide a locked mechanism protected from shock to insure dependable operation when it is initiated. Dependent upon the positioning of the spiral 152, an interval of time elapses before latch 10 releases the rear blade 3. When blade 3 is released it springs to the right to the position illustrated in Fig. 23, causing the apertures 136 to move beyond the apertures 135 and thus terminate the exposure. Movement of blade 3 rotates latch 10 clockwise against the tension of spring 139, and the tip of latch 10 presses lightly against blade 3.

When a manually controlled time exposure is desired corresponding to the actions illustrated in Figs. 8 and 9, the primary latch 9 is first released, as shown in Fig. 8, but due to the fulcrum 149 being opposite the minor radius portion 156 in cam 48 the main lever 8 cannot release the secondary latch 10. The blades will, therefore, rest in the position illustrated in Fig. 22 as long as the release button 133 is held depressed. When the button is relinquished release lever 16 yields to spring 157 and the portion 89 of the release lever 16 strikes the main lever stud 158 to release the secondary latch 10 and complete the exposure.

*Shutter blade pads and springs*

At the right end of the slot between plates 5 and 6 there is provided a pair of pads of shock-absorbing material, such as a pad formed of $\frac{1}{32}$ inch thick velum paper. There is a pad 169 adjacent the upper corners of the blades and a pad 170 adjacent the lower corners of the blades. It will be noted that the blade 1 has its end notch 167 in such position that the blade 1 is prevented from striking pad 170 and only strikes the upper pad 169. Similarly notch 168 in blade 3 causes blade 3 to strike the pad 170 only. This spacing of the pads and having them substantially independent of each other tends to eliminate the possibility of shutter bounce of such an extent as to uncover the lenses after termination of the exposure. If the two blades struck the same pad there would be the possibility of the timed blows setting up sympathetic vibrations to such an extent as to bounce the rear shutter blade 3 back sufficiently to uncover the lenses.

In Figs. 18 and 19 it will be seen that blade 1 is provided with a wide slot 180 which has a narrow extension 181 at its top extending toward the left of the blade. At the shoulder formed at the beginning of the extension 181 there is provided a hole 182. The rear blade 3 has a slot 183 of substantially the same length as slot 180 and a short extension 184 at its lower left corner adapted to overlie the hole 182 in blade 1. Just above the extension 184 there is a small hole 185 adapted to overlie the beginning of the extension 181 in blade 1.

Figure 25:
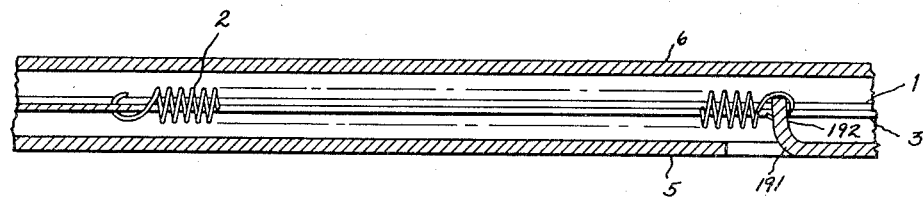
Fig. 25 is a partial vertical section on an enlarged scale taken substantially along the line 25—25 of Fig. 24.

Referring to Fig. 24 it will be seen that the front shutter blade case plate 6 is provided with an embossed ridge 187 and a lower parallel ridge 188 which extend inwardly into the space between the case plates 5 and 6. The rear plate 5 is provided with matching ridges 189 and 190 respectively. The adjacent surfaces of the ridges define guides for the shutter blades 1 and 3. Below the lower guides there is a wide space provided by stamping the plates outwardly and the slots 180 and 183 in the shutter blades lie within this wide space. In Fig. 25 it will be seen that a tongue 191 is stamped inwardly from plate 5, the tongue being provided with a pair of holes 192 vertically spaced the same distance as the distance between the holes 182 and 185 in the shutter blades. The spring 2 which operates the front shutter blade extends from hole 182 to the lowermost hole 192 and the spring 4, which operates the rear shutter blade 3, extends from hole 185 to the uppermost hole 192. The springs lie within the slots 180 and 183 and do not bear against either shutter blade at any point except at their connecting ends. The ends of the springs passing through the holes 182 and 185 extend into the extensions 184 and 181 respectively at certain periods of the shutter operation. Fig. 25 illustrates the springs 2 and 4 extended as they would appear when the shutter blades are in "set" position toward the left. When blade 1 moves toward the right the hook on spring 4 is still clear of the front blade due to the extension 181.

There are thus provided operating springs of equal length which may be formed so as to have very nearly the same resiliency and which are tensioned to very nearly the same extent when the blades are set, and neither of which is subjected to frictional resistance by bearing against any other part. When the high speed, or fastest, exposure is desired the two blades are released simultaneously by the latch 9 and flash past the lenses, maintaining, because of the matched springs, the aperture slot seen in Fig. 21. When an adjustably longer exposure is desired latch 10 releases blade 3 at a timed interval after latch 9 releases blade 1. Therefore, the slot provided by the apertures is wider or fully opened as determined by the setting of cam 48. In most instances the speed of the blades is sufficiently great to permit blade 1 to complete its movement and come to rest before blade 3 starts to cover the lenses.

*Synchro-switch*

Figure 26:
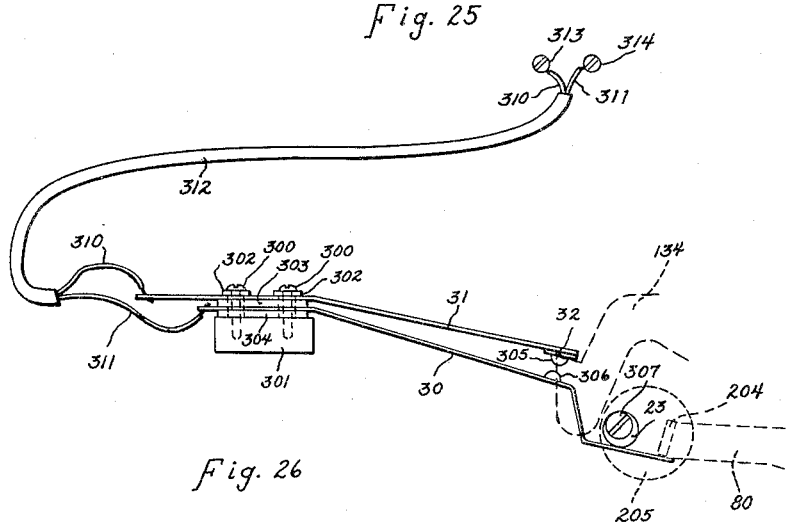
Fig. 26 is a plan view of the synchro-switch with related mechanism shown in skeleton outline.
Figure 27:
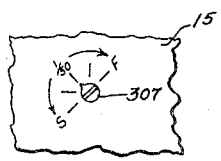
Fig. 27 is a partial bottom view showing the synchro-switch adjustment screw.

In Fig. 5 it will be noticed that between the latch 10 and the latch pawl 11 there is an opening through the intermediate plate 143 through which a tab 32 projects to engage a shoulder 159 on the primary latch pawl 134. In Fig. 26 it will be seen that this tab 32 is mounted on the free end of a short spring contact blade 31. The spring contact blade 31 is retained by screws 300 against the side of a projection 301 rising from the bottom plate 15. Insulators 302 insulate the switch blade 31 from the screws 300 and the rear surface of the blade rests against a strip of insulating material 303. The strip 303 is mounted on the outer surface of a long switch blade 30 which is also insulated from the screws 300 by the insulators 302. It in turn rests upon a strip of insulating material 304 positioned between it and the projection 301.

The lower end of the tab 32 is mounted to blade 31 by a silver contact 305 which is in alignment with a silver contact 306 mounted on the long blade 30. The blade 30 continues on beneath the plate 143 and bears against an eccentric screw 23 rising upward from the bottom plate 15.

By adjusting the relative position of the eccentric 23 the contacts 305 and 306 are positioned at an adjustable distance from each other when the camera is in "set" position, as seen in Fig. 26, with the pawl 134 latched in position as in Fig. 5.

A wire 310 is soldered to blade 31 and a wire 311 is soldered to blade 30. The two wires are passed through an insulating sheath 312 which passes forward to a position below and between the lenses where the wires 310 and 311 are connected to terminals 313 and 314 respectively, which pass through, but are insulated from, the bottom plate and are in position to receive wires (not shown) leading to a flash bulb socket and means for applying voltage to the flash bulb when the contacts 305 and 306 are brought together.

When it is desired to take a flashlight picture appropriate standard bulb and battery accessories are connected to terminals 313 and 314 preparatory to flashing the bulb by closing contacts 305 and 306. The film is exposed by pressing the button 133 (Fig. 14). Downward motion of the button 133 moves the release lever 16 through the action of the trip lever 244. The tail 30 and the bent-down tab 204 (Fig. 13) normally hold the long switch blade 30 away from the eccentric screw 23 to a position sufficiently far from blade 31 that the contacts 305 and 306 cannot touch regardless of the position of other cooperating elements. Initial movement of lever 16, and hence of tab 204, permits the blade 30 to yield to its inherent tension and come to rest in its active position against eccentric screw 23 shown in Fig. 26. Additional movement of lever 16 releases the primary latch pawl 134 which starts to rock counterclockwise as described previously. Very slight angular movement of pawl 134 from its normal "set" position moves the shoulder 159 sufficiently to permit blade 31 to yield to its inherent tension and bring contact 305 against contact 306. Additional movement of pawl 134 releases latch 9 and shutter blade 1 as described previously. The relationship between hook 200 and shoulder 159 is preferably such that contact 305 is brought to bear against contact 306 approximately 1/50 of a second before hook 200 releases latch 9 for most flash bulbs. In this manner the flash bulb is ignited and permitted to come to full intensity of light before the opening of the lens apertures. Adjustment of the position of eccentric 23 by an attached slotted head 307 permits the 1/50 second interval to be varied as desired. Preferably the head 307 extends through the bottom plate 15 in order that such adjustment may be made from outside of the camera, and may be calibrated with respect to a visible scale. Release of button 133 (Fig. 14) by the operator after completion of the exposure prompts spring 157 (Fig. 5) to move the lever 16 and its tab 204 counterclockwise, returning the switch blade 30 to its inactive position with the contacts open. In this manner the circuit is rendered safe for the operator to replace the flash bulb before resetting the shutter if he prefers without the danger of suffering severe burns from loading bulbs in "hot" circuits.

After the latch 9 is released pawl 134 continues to the end of its movement and may be returned by the reset mechanism. The resetting operation moves pawl 134 clockwise whereupon the shoulder 159 engages tab 32 and moves blade 31 against its tension to the "set" position.

It will be noted that the spring tension of the short blade 31 on the primary latch pawl 134 serves two useful purposes. The obvious purpose is to bring the contacts together with sufficient pressure for reliable electrical contact when the primary latch pawl 134 permits the contacts to come together. The second and obscure purpose is to apply additional starting torque to the primary latch pawl 134. This is accomplished due to the tab 32 pressing against the shoulder 159 and tending to rotate the pawl 134 in the same direction that it is forced by the spring 14, and this additional force increases the acceleration of the escapement, or, in other words, aids in overcoming the inertia of the escapement when the shutter is tripped. The torque supplied by the switch blade 31 is applied only until the contacts close which, as has been noted above, is approximately 1/50 of a second before the shutter opens. Therefore the force of the spring blade 31 has no effect on the shutter timing which takes place after latch 9 is released. During the shutter timing period, i. e., from the release of latch 9 to the release of latch 10, the only force applied to the escapement mechanism is that of spring 14. It will be observed that there is no possibility of error due to manual interference with the timing of the switch since the timing is accomplished solely by the pawl 134 after the release lever 16 is operated. The primary latch pawl 134 positively times the opening of the shutters and the flashing of the bulb since both operations are entirely under its control.

I have thus provided photo-flash synchronization mechanism which is not in any manner affected by the operation of the shutter release button. An operator who depresses the button slowly will have exactly the same result as an operator who depresses the button rapidly. It will also be apparent that the use of pigtails is eliminated both for simplicity of construction and uniformity and dependability of operation.

*Other mechanisms*

In Figs. 1 to 5 inclusive there are disclosed various other mechanisms, at least in part. For example, it will be seen that there is a knob 65 attached to an exposure counter dial. Mechanism provided within the camera rotates the dial to the proper extent each time that reset knob 40 advances the film. At the center of the camera to the left of knob 65 there is provided a view-finding device. To the left of center there is a knob 127 which (1) permits rewinding exposed film into the daylight loading magazine; (2) permits winding a predetermined length of exposed leader past the exposure apertures for economical loading of fresh film; (3) permits resetting the shutter without advancing the film; and (4) permits normal film advance sequence of alternately one frame and three frames automatically. At the extreme left of the camera there is a rewind knob 37 which operates in the usual manner to rewind the strip of film material into its daylight loading magazine. In front of the window 144 there is a window through which is visible a focus tape 100 having indicia for indicating the distance from the lenses to the plane in sharpest focus. At the right of the window 144 there is a shield 118 adapted to move across and mask the indicia on the tape 100. At the left of the window 144 there is a shield 117 having indicia thereon for indicating the "f-stop" of the lens irises, shield 117 also moving across and masking the indicia on tape 100. The shields 117 and 118 are interconnected for simultaneous movement in opposite directions when a stop selector wheel 400 is rotated. The tape 100 is movable past an index point when a focus selector wheel 401 is rotated. The wheel 401 is rotated to focus the lenses on the subject by setting the scale reading corresponding to the distance to the subject adjacent to the index point; the f-stop wheel is then rotated to set the selected f-stop value of the lens irises indicated by the f scale on shield 117 opposite its index point. The shield 118 moves simultaneously with the movement of the shield 117 and in the opposite direction. The two shields, therefore, uncover a variable portion of the tape 100, the limits of which define the depth of field for that focal distance and that particular stop value. The wheel 401 adjusts the front element of the lenses to focus on the film located adjacent the back of the camera. The wheel 400 controls the opening of the irises for proper exposure under varying light conditions. These other mechanisms briefly mentioned herein may be more completely ascertained from my co-pending applications, Serial No. 754,962, filed June 16, 1947, and Serial No. 754,963, filed June 16, 1947, now, respectively, Patent No. 2,527,106, issued October 24, 1950, and Patent No. 2,515,272, issued July 18, 1950.

It is to be appreciated that the instant disclosure is with respect to a stereoscopic camera having a pair of lenses. However, it will be apparent to any person skilled in the art that the shutter blades 1 and 3 might have single apertures therethrough so located as to admit light through a single set of lenses for the taking of ordinary photographs. I do not intend that this patent should be limited to a stereoscopic camera.

Having illustrated and described the preferred embodiment of the present invention, it should be apparent to those skilled in the art that the combination and various portions of the combination, are subject to modification in detail and arrangement. Likewise, some one operation of the herein disclosed mechanism may be utilized without utilizing the others in cameras omitting some of the refinements of the present camera, or in cameras having other types of mechanism for achieving similar functions. All such modifications in detail and arrangement as come within the scope of the appended claims are considered to be a part of my invention.

I claim:

1. In a camera of the type including a pair of longitudinally movable shutters each having an aperture therein and each being movable independently of the other from a set position to a released position during which said shutters move relative to the lens of the camera for exposing a portion of a film in the camera, the aperture of a first one of said shutters being aligned with the lens when said first shutter is in set position and out of alignment therewith when in released position and the aperture of the second of said shutters being out of alignment with the lens when said second shutter is in set position and in alignment therewith when in released position whereby light is prevented from striking the film when both shutters are either at set position or at released position, said apertures being overlapped to provide a minimum opening out of alignment with the lens when said shutters are in set position and said apertures providing a maximum opening in alignment with the lens when said first shutter is held at its set position and said second shutter is at its released position, a shutter spring associated with each of said shutters for independently moving said shutters from set position to released position, said shutters being movable under the influence of said shutter springs at substantially the same speed whereby if said shutters are released at the same instant a minimum exposure occurs since said apertures remain in their same relative position during simultaneous movement of the shutters past the lens, if said first shutter is released during the movement of said second shutter from its set to its released position said apertures overlap to a variable extent determined by the relative position of the second shutter at the instant said first shutter is released in order that variably timed high speed exposures may be made, and if said first shutter is held at set position until after said second shutter has come to rest at released position timed exposures of variable duration may be made; the improved shutter controlling mechanism comprising a manually operable part, a reset lever having operative association with both of said shutters, crank means connecting said reset lever to said manually operable part including a reset lever crank pin movable through one complete revolution at each operation of said manually operable part whereby said reset lever returns said shutters to set position and is then returned to a position of readiness for a subsequent resetting operation, a primary shutter latch and a primary shutter latch spring associated therewith and constantly urging said primary shutter latch to latching position in engagement with both of said shutters to hold both shutters in set position when returned thereto, a secondary shutter latch and a secondary shutter latch spring associated therewith and constantly urging said secondary shutter latch into latching position additionally to hold said first shutter in set position when returned thereto, a primary shutter latch pawl engageable with said primary shutter latch to hold it in latching position, means on said reset lever to move said primary shutter latch pawl into holding engagement with said primary shutter latch, means to lock said primary shutter latch pawl in engaged position, primary shutter latch pawl spring means biasing said primary shutter latch pawl toward latch releasing position, a manual trip device including means to release said primary shutter latch pawl locking means whereby both shutters may be simultaneously released from said primary shutter latch, a secondary shutter latch pawl engageable with said secondary shutter latch to lock said secondary shutter latch in holding position, spring means biasing said secondary shutter latch pawl toward holding position, means engageable with secondary shutter latch pawl to move the same to inoperative position whereby said first shutter may be freed to move from set position to released position comprising a floating lever engageable with said secondary shutter latch pawl and including a fulcrum portion, a timing cam, manual means connected to said timing cam rotatively to move selected portions thereof into operative alignment with said fulcrum portion of said floating lever to vary the movement of said floating lever, and escapement means operatively associated with said floating lever and driven by said primary shutter latch pawl spring means.

2. The structure set forth in claim 1 wherein said timing cam comprises a major radius portion which, when aligned with the fulcrum portion of said floating lever, causes said secondary shutter latch pawl to be moved to inoperative position by said floating lever prior to release of said primary shutter latch whereby said minimum opening flashes past the lens to effect a minimum exposure when said primary shutter latch pawl subsequently moves to inoperative position.

3. The structure set forth in claim 1 wherein said timing cam comprises a spiral portion which, when any selected point thereon is moved into alignment with the fulcrum portion of said floating lever, causes said secondary shutter latch pawl to be moved to inoperative position by said floating lever subsequent to release of said primary shutter latch but during movement of said second shutter whereby high speed exposures of variable extent are effected.

4. The structure set forth in claim 1 wherein said timing cam comprises a minor radius portion which, when moved into alignment with the fulcrum portion of said floating lever, causes said floating lever to be rendered incapable of releasing said secondary shutter latch pawl until after said second shutter has come to rest whereby timed exposures may be effected.

5. The structure set forth in claim 1 wherein said timing cam comprises a minor radius portion which, when moved into alignment with the fulcrum portion of said floating lever, causes said floating lever to be rendered incapable of releasing said secondary shutter latch pawl until after said second shutter has come to rest; in combination with manual trip device spring return means operative to return said manual trip device to normal position upon manual release thereof, and means on said floating lever engageable with said manual trip device to release said secondary shutter latch pawl during returning movement of said manual trip device whereby manually controlled timed exposures may be effected.

6. The structure set forth in claim 1 wherein said timing cam comprises a portion of such radius that, when said portion is moved into alignment with the fulcrum portion of said floating lever, said floating lever is rendered ineffective to release said secondary shutter latch pawl until a fixed interval of time after said second shutter has come to rest.

7. The structure set forth in claim 1 wherein said timing cam comprises a portion of such radius that, when said portion is moved into alignment with the fulcrum portion of said floating lever, said floating lever is rendered ineffective to release said secondary shutter latch pawl until a fixed interval of time after said second shutter has come to rest; in combination with manually adjustable means to vary the speed of said escapement means whereby selectively to vary the fixed interval of time of release of said secondary shutter latch pawl after said first shutter has come to rest whereby long exposures of adjustably fixed duration may be made when said trip device is operated.

8. The structure set forth in claim 1 wherein said primary shutter latch pawl is pivotally connected to a portion of said floating lever whereby said primary shutter latch pawl spring means tends to cause movement of said floating lever in one manner upon release of said primary shutter latch pawl, and said escapement mechanism is connected to said floating lever through a pin and slot connection.

9. The structure set forth in claim 1 wherein said primary shutter latch pawl is pivotally connected to a portion of said floating lever whereby said primary shutter latch pawl spring means tends to cause movement of said floating lever in one manner upon release of said primary shutter latch pawl, said escapement mechanism includes a sector gear, said sector gear is connected to said floating lever through a pin and slot connection, and said secondary shutter latch pawl spring means is operatively associated with said floating lever at a point remote from said pin and slot connection whereby said floating lever pivots about said point until said fulcrum portion engages said timing cam.

10. The structure set forth in claim 1 wherein said primary shutter latch pawl is pivotally connected to a portion of said floating lever whereby said primary shutter latch pawl spring means tends to cause movement of said floating lever in one manner upon release of said primary shutter latch pawl, said escapement mechanism includes a sector gear, said sector gear is connected to said floating lever through a pin and slot connection, said secondary shutter latch pawl spring means is operatively associated with said floating lever at a point remote from said pin and slot connection whereby said floating lever pivots about said point until said fulcrum portion engages said timing cam, and said primary shutter latch pawl spring means is of greater strength than said secondary shutter latch pawl spring means whereby when said fulcrum portion bears against said timing cam said secondary latch is released, the time of release thereof with respect to the time of release of said primary latch being controlled by the position of said timing cam and the speed of said escapement means.

11. The structure set forth in claim 1 wherein said primary shutter latch pawl is pivotally connected to a portion of said floating lever whereby said primary shutter latch pawl spring means tends to cause movement of said floating lever in one manner upon release of said primary shutter latch pawl, said escapement mechanism includes a sector gear, said sector gear is connected to said floating lever through a pin and slot connection, said secondary shutter latch pawl spring means is operatively associated with said floating lever at a point remote from said pin and slot connection whereby said floating lever pivots about said point until said fulcrum portion engages said timing cam, and said primary shutter latch pawl spring means is of greater strength than said secondary shutter latch pawl spring means whereby when said fulcrum portion bears against said timing cam said secondary latch is released, the time of release thereof with respect to the time of release of said primary latch being controlled by the position of said timing cam and the speed of said escapement means; in combination with means selectively to adjust the speed of said escapement means.

12. The structure set forth in claim 1 wherein said primary shutter latch pawl is pivotally connected to a portion of said floating lever whereby said primary shutter latch pawl spring means tends to cause movement of said floating lever in one manner upon release of said primary shutter latch pawl, said escapement mechanism includes a sector gear, said sector gear is connected to said floating lever through a pin and slot connection, said secondary shutter latch pawl spring means is operatively associated with said floating lever at a point remote from said pin and slot connection whereby said floating lever pivots about said point until said fulcrum portion engages said timing cam, and said primary shutter latch pawl spring means is of greater strength than said secondary shutter latch pawl spring means whereby when said fulcrum portion bears against said timing cam said secondary latch is released, the time of release thereof with respect to the time of release of said primary latch being controlled by the position of said timing cam and the speed of said escapement means; in combination with means to adjust the speed of said escapement means comprising a ratchet operatively connected to said sector gear, a first escapement pawl continuously engaging the teeth of said ratchet, a second escapement pawl normally disengaged from the teeth of said ratchet, and means to place said second escapement pawl in engagement with the teeth of said ratchet comprising a pawl controlling cam coaxially fixed to said timing cam.

13. The structure set forth in claim 1 wherein said primary shutter latch pawl is pivotally connected to a portion of said floating lever whereby said primary shutter latch pawl spring means tends to cause movement of said floating lever in one manner upon release of said primary shutter latch pawl, said escapement mechanism includes a sector gear, said sector gear being connected to said floating lever through a pin and slot connection, said secondary shutter latch pawl spring means is operatively associated with said floating lever at a point remote from said pin and slot connection whereby said floating lever pivots about said point until said fulcrum portion engages said timing cam, and said primary shutter latch pawl spring means is of greater strength than said secondary shutter latch pawl spring means whereby when said fulcrum portion bears against said timing cam said secondary latch is released, the time of release thereof with respect to the time of release of said primary latch being controlled by the position of said timing cam and the speed of said escapement means; in combination with means to adjust the speed of said escapement means comprising a ratchet operatively connected to said sector gear, a first escapement pawl continuously engaging the teeth of said ratchet, a second escapement pawl normally disengaged from the teeth of said ratchet, a pawl lever supporting said second escapement pawl, a pawl controlling cam operatively connected to said timing cam, a pawl lever spring urging said pawl lever to bear against said pawl controlling cam, said pawl controlling cam being so arranged as to permit said second escapement pawl to move into engaging position when said timing cam is adjusted to position the part of its spiral portion adjacent its minor radius portion in alignment with the fulcrum portion of said floating lever.

14. The structure set forth in claim 1 in which said means to lock said primary shutter latch pawl in engaged position includes a primary shutter latch pawl locking member, a spring constantly urging said locking member into locking position, and said primary shutter latch pawl and said locking member comprise cooperating surfaces for holding said locking member from its locking position after said primary shutter latch pawl once starts to move.

15. The structure set forth in claim 1 in which said means to lock said primary shutter latch pawl in engaged position includes a primary shutter latch pawl locking member, a spring constantly urging said locking member into locking position, and said primary shutter latch pawl and said locking member comprise cooperating surfaces for holding said locking member from its locking position after said primary shutter latch pawl once starts to move; in combination with means for controlling said locking member comprising a cam and a cam follower coaxially fixed to said crank means.

GORDON N. SMITH.

REFERENCES CITED

The following references are of record in the file of this patent:

UNITED STATES PATENTS

| Number | Name | Date |
| --- | --- | --- |
| 423,913 | Dossert | Mar. 25, 1890 |

(Other references on following page)

UNITED STATES PATENTS

| Number | Name | Date |
|---|---|---|
| 1,091,814 | Dietz | Mar. 31, 1914 |
| 1,600,407 | Gesell et al. | Sept. 21, 1926 |
| 1,698,063 | Ohlau | Jan. 8, 1929 |
| 1,707,849 | Fairchild | Apr. 2, 1929 |
| 2,068,911 | Goldhammer | Jan. 26, 1937 |
| 2,074,767 | Aichele | Mar. 23, 1937 |
| 2,111,425 | Goldhammer | Mar. 15, 1938 |
| 2,117,972 | Mihalyi | May 17, 1938 |
| 2,150,642 | Wachtler | Mar. 14, 1939 |
| 2,165,403 | Mihalyi | July 11, 1939 |
| 2,293,784 | Werner | Aug. 25, 1942 |
| 2,340,405 | Schwarz | Feb. 1, 1944 |
| 2,355,825 | Schwarz | Aug. 15, 1944 |
| 2,358,061 | Drotning | Sept. 12, 1944 |
| 2,367,195 | Bolsey | Jan. 16, 1945 |
| 2,400,778 | Osborne | May 21, 1946 |
| 2,405,741 | Fuerst | Aug. 13, 1946 |
| 2,418,644 | Hutchison, Jr. et al. | Apr. 8, 1947 |
| 2,448,876 | Fuerst | Sept. 7, 1948 |

FOREIGN PATENTS

| Number | Country | Date |
|---|---|---|
| 493,693 | Great Britain | Oct. 11, 1938 |